April 5, 1938.  H. G. DYBVIG  2,112,833
PIN FEEDING DEVICE
Filed April 12, 1935  3 Sheets-Sheet 1
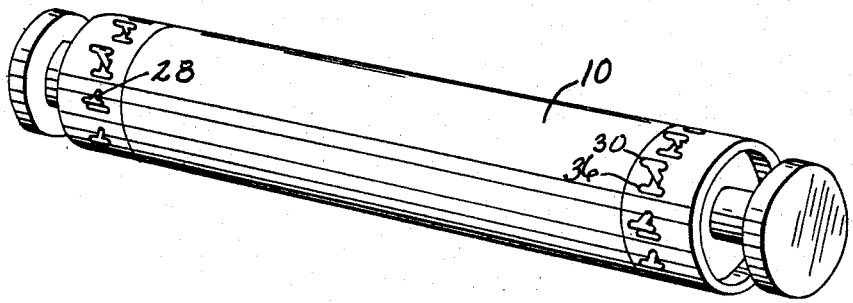
Fig.1
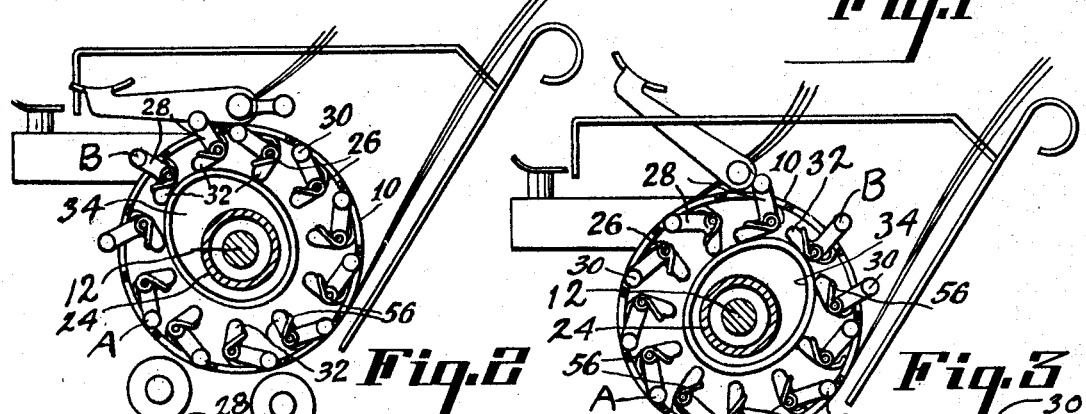
Fig.2  Fig.3
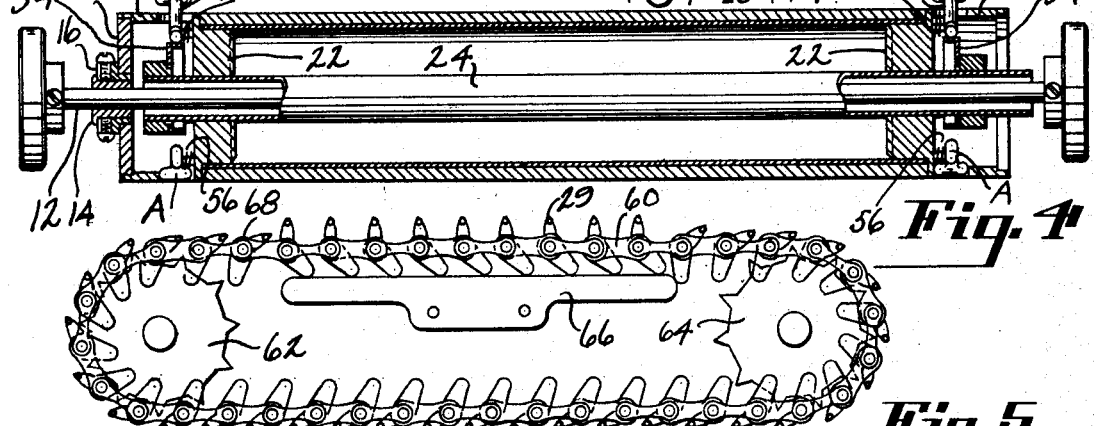
Fig.4
Fig.5
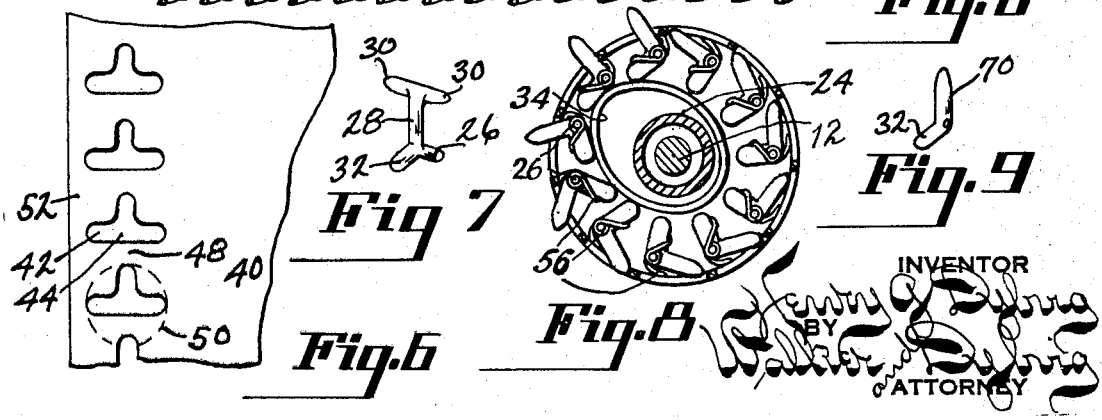
Fig.6  Fig.7  Fig.8  Fig.9

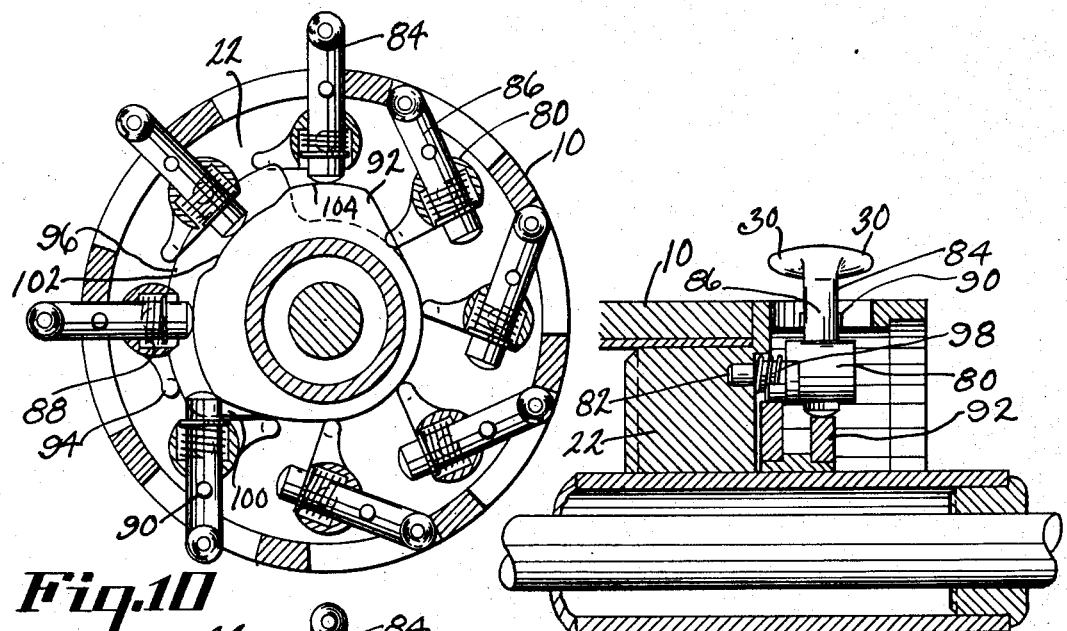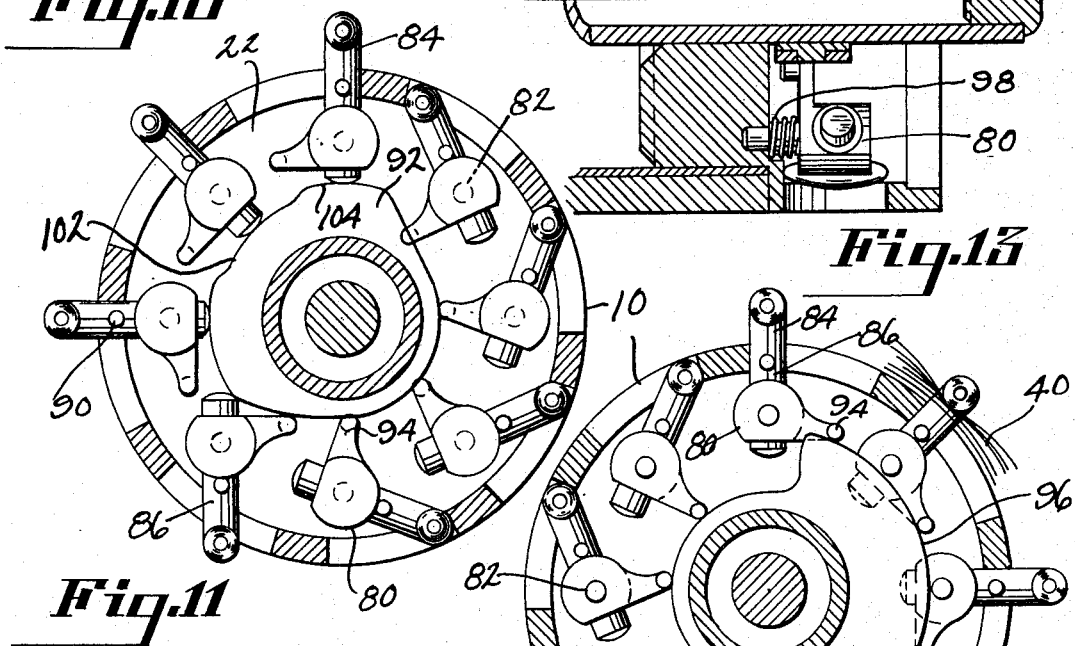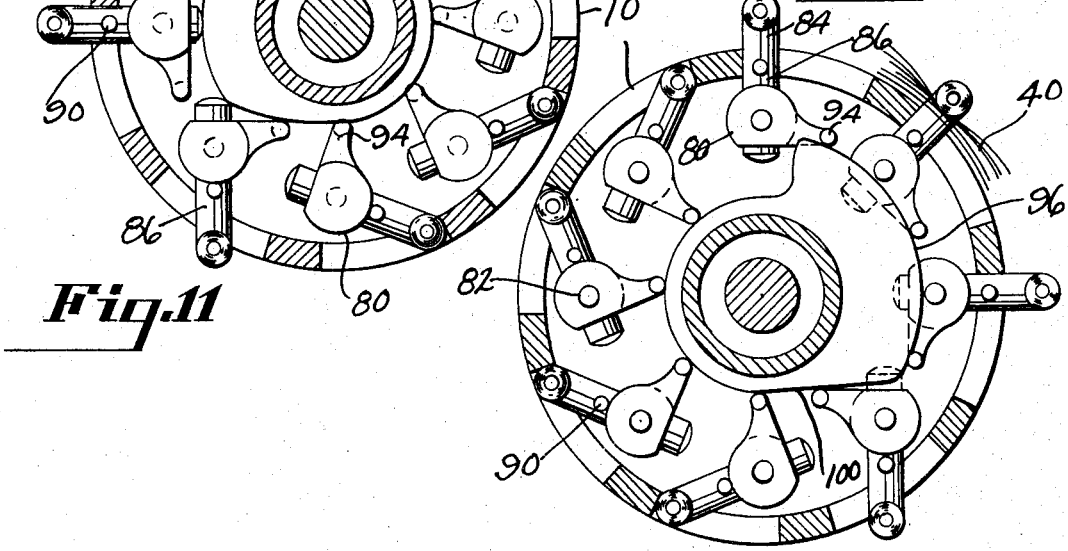

April 5, 1938.  H. G. DYBVIG  2,112,833
PIN FEEDING DEVICE
Filed April 12, 1935   3 Sheets-Sheet 3
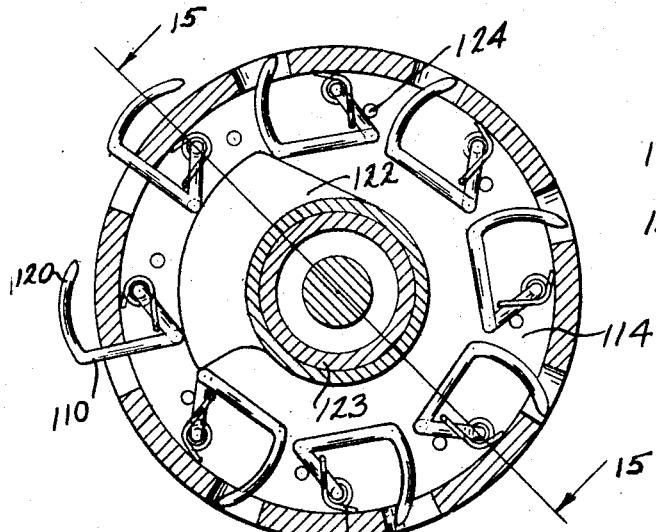
Fig.14
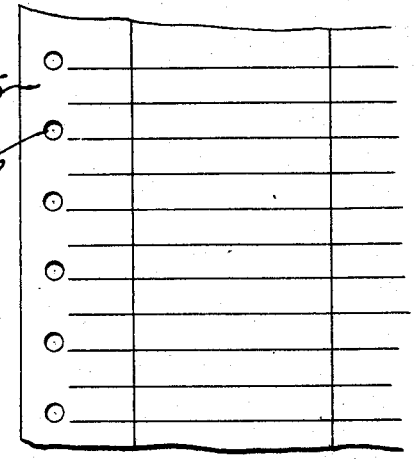
Fig.17
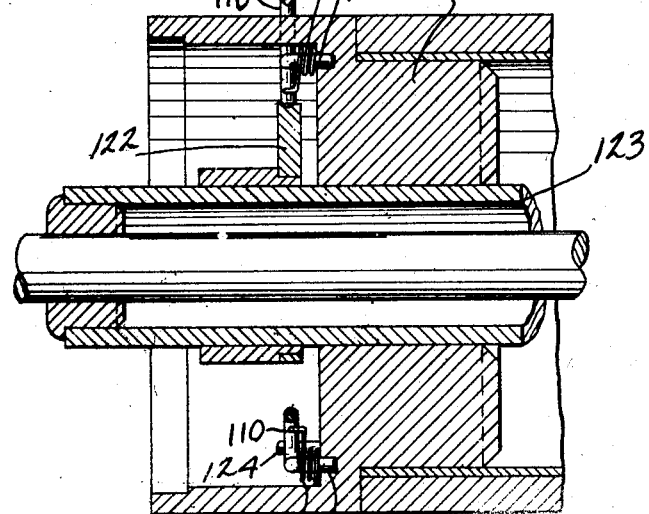
Fig.15
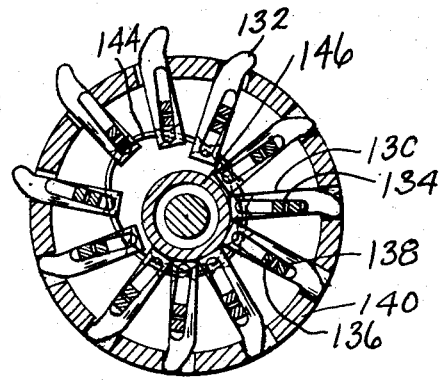
Fig.18
Fig.16
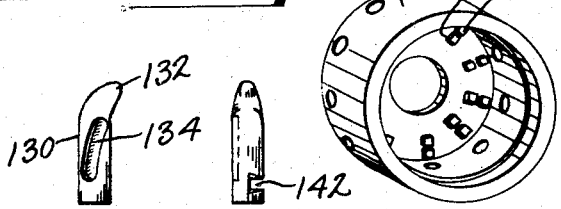
Fig.19  Fig.20  Fig.21
INVENTOR
Henry G. Dybvig
BY Walker and Sylva
ATTORNEY Patented Apr. 5, 1938

2,112,833

UNITED STATES PATENT OFFICE 2,112,833

PIN FEEDING DEVICE

Henry G. Dybvig, Dayton, Ohio, assignor to John Q. Sherman, Dayton, Ohio

Application April 12, 1935, Serial No. 16,008

23 Claims. (Cl. 197—133)

This invention relates to writing machines and particularly to positive feed for advancing the record material through the machine. In the Sherman patent No. 2,000,649 and in a copending application to Sherman and Dybvig, Serial No. 12,206, filed March 21, 1935, pin wheel feeding devices have been shown wherein the pins advance into and leave the record material substantially along the radius of curvature thereof, so as to prevent mutilation or tearing of the record material, thereby producing a feed for the record material that feeds the same in aligned relation. When the feeding pin enters the record material along the radius of curvature, the feeding pin extending substantially coincident with the radius of curvature during the effective feeding operation, the paper may be held loosely in contact with the feeding pins without frictional engagement.

In the present embodiment it is not necessary to loosely hold the record material in contact with the feeding pins, as the feeding pins have been provided with an enlarged head or an outwardly extending projection which engages the record material. The record material is preferably provided with a tapering aperture or an aperture having a reduced portion. This requires a movement of the feeding pin which permits the feeding pin to enter the record material through an arcuate path, permitting the enlarged portion or extension of the pin to move through an enlargement of the aperture in the record material, the pin, after passing through this enlargement, moving into the reduced portion so as to permit the extension to overhang the record material, the extension moving to loosely hold the record material in position.

Small round feed holes as now known to the art may be used when hooked-shaped feeding pins are used, the hooked ends of the feeding pins passing through the holes to hold the record material loosely over the feed pins.

An object of this invention is to provide a pin wheel feeding device wherein the pins hold the record material in engagement therewith.

Another object of this invention is to provide a pin feeding device wherein the pins are provided with means for loosely engaging the record material to hold the same in position.

Another object of this invention is to provide record material having apertures that will permit the use of a feeding pin having means for loosely holding the record material in position.

Another object of this invention is to provide a pin wheel feeding device that is cheap, that is efficient, dependable and that will accurately feed superposed strips of record material in aligned relation past writing position.

Another object of this invention is to provide feeding pins provided with hooks for engagement with the record material.

With the above primary and other incidental objects in view, as will more fully appear in the specification, the invention consists of the features of construction, the parts and combinations thereof, and the mode of operation, or their equivalents, as hereinafter described and set forth in the claims.

Referring to the drawings, Fig. 1 discloses a perspective view of a preferred modification of a feed roll, provided with feeding pins.

Fig. 2 discloses a transverse sectional view taken substantially on the line 2—2 of Fig. 1.

Fig. 3 is a sectional view also taken substantially on the line 2—2 of Fig. 1 after the feeding device has been moved into inoperative position.

Fig. 4 discloses a longitudinal view of the modification disclosed in Fig. 1.

Fig. 5 discloses a sectional view of another modification embodying a feeding device for feeding record material traveling along a straight path.

Fig. 6 discloses a fragmentary view of the record material.

Fig. 7 shows a feeding pin drawn to an enlarged scale as used in the modification disclosed in Figs. 1 and 5.

Fig. 8 discloses another modification wherein a straight feeding pin swinging into engagement with the record material has been disclosed.

Fig. 9 shows the feeding pin disclosed in Fig. 8 drawn to a larger scale.

In Figs. 10, 11, 12 and 13 another modification has been disclosed wherein Fig. 10 shows a cross sectional view taken substantially on the line 10—10 of Fig. 13.

Fig. 11 discloses a cross sectional view showing the cam controlling the longitudinal movement of the pin with respect to the individual pin support.

Fig. 12 is a sectional view showing the cam controlling the swinging movement of the feeding pin.

Fig. 13 is a longitudinal sectional view of one end of a feed roll or platen, showing the arrangement of the feeding pin mounting.

Fig. 14 is a transverse sectional view of another modification.

Fig. 15 is a longitudinal section view taken along the line 15—15 of Fig. 14.

Fig. 16 is a perspective view of the feeding pin used in the modification shown in Figs. 14 and 15.

Fig. 17 shows record material adapted for use with the above modification.

Fig. 18 shows a transverse sectional view of another modification.

Figs. 19 and 20 show perspective views of the feeding pins used in the modification shown in Fig. 18.

Fig. 21 is a detail perspective view of the end collar used in the modification shown in Fig. 19.

Like parts are indicated by similar characters of reference throughout the several views.

Referring to the preferred modification disclosed in Figs. 1, 2, 3, 4 and 7, a feed roll 10 which may be also used as a platen, is mounted upon a shaft 12. Shaft 12 carries a sleeve 14, having mounted thereupon a collar 16, carrying a disc 18 fixedly attached thereto and supporting a pin housing 20, provided with a transverse wall 22 rotatably mounted upon a tubular sleeve 24, which will be more fully described later.

The wall 22 has pivotably mounted therein a pintel 26, supporting a feeding pin 28 provided with a stem substantially T shaped including the outwardly projecting extensions 30. A shank 32 integrally united with the lower portion of the stem 28 is arranged to engage a cam 34 fixedly supported upon the tubular sleeve 24. The housing 20 is provided with a substantially T-shaped aperture 36, through which the head of the T-shaped pin is arranged to swing from the "in" position shown at A in Figs. 2 and 3 to the "out" position B shown in each of these figures and also shown in Fig. 4.

In use of the T-shaped pin, round apertures cannot be used satisfactorily unless the pins are either mounted extremely far apart, which is objectionable, or the extensions very short, which is also objectionable. A special type of aperture has been shown in the record material 40 found in Fig. 6. The apertures 42 are substantially T-shaped so as to permit the feeding pin 28 to swing from the position A to position B, the extensions 30 swinging out through the wide portion 44 so that pin 28 when projected is being located in the elongated narrow portion 46 of the aperture.

The maximum width of the aperture at 44 is greater than the distance from center to center of adjacent holes. This is essential if T-shaped pins are to be used, as the minimum distance forming bridges 48 between the holes must be sufficiently great to permit the aligning and feeding of the record material by the stems 28 engaging the same without stripping the holes. If round holes were to be used, as shown in dotted lines 50, the entire margin 52 would be severed from the main portion 40 and there would be no bridges 48 between the apertures for engagement of the feeding pins.

The pins 28 normally held in folded position by springs 56 are projected to the radial or erect position when the shank 32 contacts the cam 34 which swings the pin outwardly. Immediately upon the shank clearing the cam 34 the pin 28 snaps into the "in" or folded position within the platen or feed roll 10.

In Figs. 1 and 2 the feeding pins have been disclosed in operative position. By rotating the sleeve 24 and the cams 34 the pins may be projected beyond the periphery of the roll or platen 10 in a position out of engagement with the record material, as shown in Fig. 3 and similar to the operative and inoperative positions more fully described in the Sherman copending Patent No. 2,000,649 referred to above. The pin feeding devices may be locked in either operative or inoperative positions by a mechanism similar to that shown in the Sherman application.

Referring to the modification disclosed in Fig. 5 the same type of pin as disclosed in Figs. 1, 2, 4 and 7 has been used; but mounted upon a continuous chain 60, trained over the sprockets 62 and 64. The pins 29 are projected to the "out" position by a cam 66 underlying a portion of the chain 60, during which time the pins are projected into engagement with the record material to feed the same in a straight path. As soon as the pins pass beyond the cam 60 springs 68, similar to springs 56 shown in Fig. 4, retract the pins out of engagement with the record material.

In the modification disclosed in Figs. 8 and 9 a pin 70 without the extensions 30 has been shown, which may be used either with record material having round or oblong apertures. In this modification the cam 34 controls the path of movement of the shank 32 when in engagement therewith.

Referring to the modification disclosed in Figs. 10 to 13 inclusive, the feeding pins have been given a slight movement along the radius of curvature when in engagement with the record material, so as to loosely hold the record material in contact with the roll or platen 10.

In this modification individual pin mountings 80 are pivotally mounted at 82 in the wall 22, supporting the housing 20. The feeding pin 84 has a stem 86 located in a suitable recess provided therefor in the individual mounting 80. A helical spring 88 best seen in Fig. 10 biases the pins inwardly towards the center of the roll 10, this inward movement of the pin being limited either by the projection 90 carried by the pins engaging the mounting 80, or by a cam 92 fixedly mounted upon the sleeve 24.

Each pin mounting 80 is provided with heels 94 engaging a cam 96 which controls the angular position of the pin. The pin mounting, together with the pin, is biased in a counter-clockwise movement as viewed in Figs. 10 and 11, by a suitable spring 98, shown in Fig. 13. As the roll or platen 10 rotates, the pin mountings 80 and the pins 86 rotate therewith. The heels 94, when entering into engagement with the tangential portion 100 of the cam 96, swing the pin 86 from the folded position into engagement with the record material. Immediately upon the heel 94 engaging the tangential portion 100 of the cam 96 the inner end of the pin engages the cam 92, which projects the pin outwardly with respect to the individual pin mounting 80, so as to urge the pin outwardly against the force of the spring 88 to clear the record material and swing into engagement with the leading edge thereof. As the platen or roll 10 rotates the inner end of the pin drops into engagement with the arcuate depressed portion 102 of the cam 92, at which time the extensions 30 of the pin loosely engage the record material 40, as best seen in Fig. 12, where a fragmentary portion of the record material has been shown.

The extensions 30, loosely engaging the record material, permit the use of this feeding device without a separate means for loosely holding the record material in engagement with the platen or feed roll 10 and engagement with the record material.

As the platen is rotated a hump 104 in the cam 92 projects the pin outwardly where it is in readiness to be orientated or swung into inoperative position upon the heel 94, clearing the extension of the cam 96, at which time the pin snaps into the down or folded position within the platen.

As the cams 92 and 96 are fixedly attached to the sleeve 24, the pins may be projected beyond the roll or platen 10 and in a position out of engagement with the record material much the same as disclosed in Fig. 3 and disclosed in Sherman's copending application Serial No. 542,855.

Instead of T-shaped pins being used, any suitable pin provided with a head or laterally extending projections either fixedly attached to the pin or movably mounted, may be used within the purview of the invention. Likewise, the pins need not necessarily fold into the platen rearwardly with respect to the direction of travel of the paper. Any other movement accomplishing the same result could be used.

Referring to the modification disclosed in Figs. 14 to 16 inclusive, the feeding pin 110 is provided with a shank 112 pivotally mounted in the end wall 114 and biased in a counterclockwise direction, as viewed in Fig. 14, by a spring 116. The pin 110 is provided with a hooked end 120. As may readily be seen, this end 120 is arcuate and concentric with the shank 112 so as to swing through an arcuate circle as the pin 110 is rotated from the "in" position to the "out" position. The pin is thus rotated by a cam 122 fixedly attached upon the sleeve 123 which may be rotated from an operative to an inoperative position, and vice versa, and locked in such position the same as in the Sherman patent No. 2,000,649. When the pin passes beyond the influence of the cam 122 it is snapped into the "down" position to clear the apertures of the record material. When in the "out" or feeding position, the extreme end of the extension 120 is arranged in hooked relation with respect to the record material so as to loosely hold the same in contact with the platen or friction roller. Suitable pins 124 limit the counterclockwise movement of the pins 110 shown in Fig. 14.

The record material shown in Fig. 17 is provided with round apertures 126, which need not be much larger in diameter than the diameter of the pins disclosed in Fig. 14 and also the pins to be described in connection with the modifications shown in Figs. 18 to 21.

In the modifications disclosed in Figs. 18 to 21, the feeding pins 130 are provided with a hooked end or nose 132, arranged to pass through the apertures 126 in the record material and when in extended position preventing the record material from clearing the platen or roller, the feeding pins 130 having a movement similar to that disclosed in copending application to Sherman and Dybvig, Serial No. 12,206 filed March 21, 1935. Each of the feeding pins 130 is provided with a helical slot 134 along one side receiving guide pins 136 and 138 found in member 140, as is more fully described in the above referred to application.

The pins 130 are also provided with a transverse notch or slot 142 engaging a cam 144 mounted upon a tubular sleeve 146. The notch 142 cooperating with the cam 144 guides or projects the pins 130 beyond the periphery of the platen for a short distance. Simultaneously with the pin being projected outwardly, the studs 136 and 138 seated in the slots 134 urge the pin to advance with respect to the platen, so as to cause the nose of the pin 132 to override the record material and also causes the body of the pin to engage the leading edge of the aperture of the record material to give it an impulse movement, so as to more accurately align the same. The cam 144 cooperates with the notch 142 to retract the feeding pin. As the feeding pin is retracted to within the periphery of the platen, it is also retarded with respect to the movement of the platen so as to permit the nose 132 to clear or slip through the aperture in the record material. The sleeve 142 may be rotated from an operative to an inoperative position, or vice versa, and locked in either position much the same is disclosed in the Sherman patent 2,000,649. Cross reference is also made to copending application of Sherman and Dybvig, Serial No. 12,206, filed March 21, 1935.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in langauge more or less specific as to structural features it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a writing machine for use with record material provided with aligned feed holes, a pin feeding device including a support and feeding pins movably mounted upon the support and passing through the feed holes to feed and align the record material, said feeding pins having means for engaging the surface of the record material to hold the same loosely in contact with the feeding pins.

2. In a writing machine for use with record material having aligned feed holes, a pin feeding device including a travelling support, feeding pins mounted upon the support and passing through the feed holes to feed and align the record material and overhanging means movable differentially relative to the movement of the carrier in a plane parallel to the line of feeding movement of the pins into overhanging relation engagement with the surface of the record material contiguous to the feed pins for loosely holding the same in contact with the feeding pins.

3. In a writing machine for use with record material provided with aligned feed holes, a pin feeding device including a support, feeding pins pivotallly mounted upon the support, and means for oscillating said pins about the pivot to overlie and loosely engage the writing surface of the record material.

4. In a writing machine for use with record material provided with aligned feed holes, a platen, a pin feeding device including a support mounted within the platen, feeding pins pivotally mounted upon the support and means for oscillating the pins about the pivots to swing the pins from the surface of the platen through the feed holes to feed and align the record material in aligned relation past writing position.

5. In a writing machine for use with record material provided with aligned feed holes, a platen, a pin feeding device including a support mounted within the platen, feeding pins pivotally mounted upon the support and normally retracted within the periphery thereof, and means for pivotally swinging the pins beyond the surface of the platen into engagement with and out of engagement with the record material.

6. In a writing machine for use with record material provided with aligned feed holes, a pin feeding device including a support, feeding pins pivotally mounted upon the support and means for oscillating the pins about the pivots to swing the pins through the feed holes into feeding and aligning relation, to feed the record material past the writing position of the writing machine, said feeding pins being provided with extensions loosely holding the record material in contact with the support.

7. In a writing machine for use with record material provided with aligned feed holes, a pin feeding device including a support, feeding pins pivotally mounted upon the support, said feeding pins having shanks and means engaging the shanks for oscillating the pins about the pivots to swing the same through the feeding holes to feed the record material in aligned relation past writing position said feeding pins being provided with extensions which overlap the writing surface of the record material.

8. In a writing machine for use with record material provided with aligned feed holes, a pin feeding device including a support, feeding pins pivotally mounted upon the support, each of said feeding pins being provided with a shank at one end and a lateral extension at the other and means engaging the shank for oscillating its pin about the pivot to swing the pin with its extension through the feeding holes to feed the record material in aligned relation past writing position, the extension loosely engaging the record material to hold it in position.

9. In a writing machine for use with record material provided with aligned feed holes, a pin feeding device inclduing a support, feeding pins pivotally mounted in said support having longitudinal movement therewith, said feeding pins having extensions overhanging the record material so that as the pin moves longitudinally with respect to the support the extension loosely holds the record material in engagement with the pin.

10. In a writing machine for use with record material provided with aligned feed holes, a pin feeding device including a plurality of pivotal supports, feeding pins mounted in said supports and means for oscillating the supports and the feeding pins about the pivots to swing the feeding pins into engagement with the record material said pins having extensions which overlap the writing surface of the record material.

11. In a writing machine for use with record material provided with aligned feed holes, a pin feeding device including a plurality of pivotal supports, feeding pins mounted in said supports, said feeding pins having longitudinal movement with respect to said supports, means for oscillating the supports and their feeding pins into engagement with the record material and means for moving the feeding pins longitudinally while in engagement with the record material.

12. In a writing machine for use with record material provided with aligned feed holes, a pin feeding device including a plurality of movable supports, swinging feeding pins mounted in said supports, said feeding pins having a longitudinal movement with respect to their supports and means for moving the feeding pins longitudinally while in engagement with the record material.

13. In a writing machine for use with record material provided with aligned feed holes, a pin feeding device including a plurality of pivotal supports, each of which supports has a feeding pin having longitudinal movement therein, the feeding pins having extensions overhanging the record material while in engagement therewith and means for moving the feeding pins longitudinally in said supports to bring the extensions into engagement with the record material.

14. In a writing machine for use with record material provided with aligned feed holes, a movable platen, a pin feeding device associated with said platen, said pin feeding device including a support, feeding pins pivotally mounted upon the support and means for swinging the pins about the pivots in the plane of rotation of the platen into and out of engagement with the record material.

15. In a writing machine for use with record material provided with aligned feed holes, a movable platen, a pin feeding device associated with the platen, said pin feeding device including a support, feeding pins pivotally mounted upon the support and means for oscillating the pins about the pivots in the plane of rotation of the platen to swing the pins through the feed holes to feed and align the record material in aligned relation past the platen said pins having portions adapted to overlap the writing surface of the record material.

16. In a writing machine for use with record material provided with aligned feed holes a platen, a pin feeding device associated with the platen, swinging feeding pin devices for advancing the record material past the platen, each of the feeding pin devices including a pivotally mounted support, a feeding pin mounted in the support and means for swinging the feeding pins through the holes in the record material to feed and align the record material when passing the writing position of the platen said feeding pins having portions adapted to overlap the writing surface of the record material.

17. In a writing machine for use with record material provided with aligned feed holes, a rotary platen, feeding pins pivotally mounted in said platen, said pins oscillating about their pivots to pass through the feed holes and to loosely engage the record material.

18. In a writing machine for use with record material having aligned feed holes a rotary platen, pivotally mounted feeding pins supported in said platen and arranged to pass through the feed holes to feed and align the record material and overhanging means carried by the feeding pins moving into engagement with the surface of the record material for loosely holding the same in contact with the feeding pins.

19. In a writing machine for use with record material provided with aligned feed holes, a rotary platen, feeding pins movably mounted in said platen and arranged to pass through said feed holes, said feeding pins having means for engaging the surface of the record material to hold the same loosely in contact with the periphery of the platen.

20. In a writing machine for use with record material having aligned feed holes a rotary platen, feeding pins mounted in said platen arranged to pass through the feed holes to feed and align the record material and means carried by the feeding pins moving into engagement with the surface of the record material to loosely hold the same in contact with the platen.

21. In a writing machine for use with record material having feed holes adjacent the marginal edges thereof, a travelling carrier for the record material, and a feeding and aligning device for the record material including members travelling with the carrier and movable in a plane parallel to the line of movement of the carrier into engagement with the feed holes and into overlapping relation with the marginal portion of the record material.

22. In a writing machine for use with record material having feed holes adjacent the marginal edges thereof, a travelling carrier for the record material, and a feeding and aligning device for the record material including pivoted members travelling with the carrier and movable about their pivots in a plane parallel to the line of movement of the carrier into engagement with the feed holes and into overlapping relation with the marginal portion of the record material.

23. In a writing machine for use with record material having feed holes adjacent the marginal edge thereof, a travelling carrier for the record material, and a feeding and aligning device for the record material including pivotal members travelling with the carrier and movable about their pivots in a plane parallel to the line of movement of the carrier into engagement with the feed holes and into overlapping relation with the marginal portion of the record material.

HENRY G. DYBVIG.